(12) United States Patent
Bunker et al.

(10) Patent No.: US 6,773,231 B2
(45) Date of Patent: Aug. 10, 2004

(54) TURBINE BLADE CORE COOLING APPARATUS AND METHOD OF FABRICATION

(75) Inventors: Ronald Scott Bunker, Niskayuna, NY (US); Frederic Joseph Klug, Schenectady, NY (US); Shyh-Chin Huang, Latham, NY (US); Susan Marie Hyde, Piedmont, SC (US); Nirm Velumylum Nirmalan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 96 days.

(21) Appl. No.: 10/162,755

(22) Filed: Jun. 6, 2002

(65) Prior Publication Data

US 2003/0228222 A1 Dec. 11, 2003

(51) Int. Cl.⁷ ............................................... F01D 5/18
(52) U.S. Cl. .................................... 416/97 R; 416/233
(58) Field of Search ................................ 416/97 R, 95, 416/233, 232, 96 A; 415/115

(56) References Cited

U.S. PATENT DOCUMENTS

| | | | | |
|---|---|---|---|---|
| 5,246,341 A | * | 9/1993 | Hall et al. ................. | 416/97 R |
| 5,660,525 A | | 8/1997 | Lee et al. ................. | 416/97 R |
| 5,975,850 A | * | 11/1999 | Abuaf et al. .............. | 416/97 R |
| 6,000,908 A | | 12/1999 | Bunker ........................ | 416/95 |
| 6,179,556 B1 | | 1/2001 | Bunker ........................ | 415/115 |
| 6,234,755 B1 | | 5/2001 | Bunker et al. ............ | 416/97 R |
| 6,382,907 B1 | * | 5/2002 | Bregman et al. ........... | 415/115 |

FOREIGN PATENT DOCUMENTS

| | | |
|---|---|---|
| RU | 2101513 | 6/1995 |
| RU | 1533403 A1 | 11/1996 |
| RU | 2122123 C1 | 11/1998 |

OTHER PUBLICATIONS

"Turbine Blade Cover Cooling Apparatus and Method of Fabrication," RS Bunker et al., Application No.

* cited by examiner

Primary Examiner—Edward K. Look
Assistant Examiner—Dwayne J. White
(74) Attorney, Agent, or Firm—Ann M. Agosti; Patrick K. Patnode

(57) ABSTRACT

The present invention provides a cooling apparatus for cooling a turbine blade. The cooling apparatus comprises a pressure side plate comprising a plurality of pressure ribs, a suction side plate comprising a plurality of suction ribs, and a plurality of flow redirection areas. The pressure side plate is disposed over the suction side plate, where the pressure ribs are disposed at a first angle with respect to a blade span reference line and the suction ribs are disposed at a second angle with respect to the blade span reference line, to form the flow redirection areas. The present invention provides a method of fabricating the cooling apparatus for the turbine blade comprising aligning the pressure side plate and the suction side plate to form the plurality of flow redirection areas between the pressure side plate and the suction side plate.

52 Claims, 8 Drawing Sheets

TURBINE BLADE CORE COOLING APPARATUS AND METHOD OF FABRICATION

BACKGROUND

The present invention relates generally to both gas turbines and steam turbines, and more particularly to internal core cooling arrangements in turbine blades. Turbine blades are typically cooled to decrease both the bulk temperature and maximum temperature of the turbine blade material to support higher mechanical loads in the turbine blade that incorporates an improved aerodynamic performance configuration.

Steam turbines include, but are not limited, to steam turbine power generation equipment and shipboard steam turbine propulsion equipment. Gas turbines include, but are not limited to, gas turbine power generation equipment and gas turbine aircraft engines. An exemplary steam turbine typically contains a high-pressure turbine section, a low-pressure turbine section, or a combination of both, which is rotated by the steam flow. An exemplary gas turbine typically includes a core engine, having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) connected by a smaller diameter coaxial shaft to drive the front fan (located forward of the high pressure compressor) and to drive an optional low pressure compressor (located between the front fan and the high pressure compressor). The low-pressure compressor is sometimes called a booster compressor or simply a booster.

In the exemplary gas turbine, typically the fan and the high and low pressure compressors and turbines have gas turbine blades each including an airfoil portion attached to a shank portion. In the exemplary steam turbine, typically the high and low pressure turbine sections have steam turbine blades each including an airfoil portion attached to a shank portion. Rotor blades are gas or steam turbine blades attached to a rotating gas or steam turbine rotor discs, respectively. Stator vanes are gas turbine blades or steam turbine blades attached to a non-rotating gas or steam turbine stator casings, respectively. Typically, there are alternating circumferential rows of radially-outwardly extending rotor blades and radially-inwardly extending stator vanes. When present in the gas turbine configuration, at least one first and one last row of stator vanes (also called inlet and outlet guide vanes) typically have their radially-inward ends also attached to a non-rotating gas turbine stator casing. Counter rotating "stator" vanes are also known in gas turbine designs. Conventional gas and steam turbine blade designs typically have airfoil portions that are made entirely of metal, such as titanium, or are made entirely of a composite. The all-metal blades, including costly wide-chord hollow blades, are heavier in weight, resulting in lower fuel performance and requiring sturdier blade attachments.

In a gas turbine aircraft application, the gas turbine blades that operate in the hot gas path are exposed to some of the highest temperatures in the gas turbine. Various design schemes have been pursed to increase the longevity of the blades in the hot gas path. By way of example and not limitation, these design schemes include blade coatings, and internal cooling of the blades.

In one common internal core cooling arrangement, a series of radial cooling holes extend through the entire turbine blade. The turbine blade is first manufactured as a solid blade. The solid blade is then drilled using Electro-Chemical Machining (ECM) or Shaped-Tube Electro-Chemical Machining (STEM), to create a plurality of through holes from about a blade root to about a blade tip. The radial cooling holes in axially long blades can be difficult to machine, sometimes requiring drilling from both ends of the blade. The blade with the radial cooling holes tends to have more mass than is desired. The extra mass can be problematic during thermal transients as the interior surfaces and the exterior surfaces of the blade do not respond at the same rate to the thermal transient, which results in thermal stresses. Moreover, the use of radial cooling holes is generally not possible in the leading and trailing edges of the blades, due to the three dimensional curvature of the blade. Alternatively, the need to locate the radial cooling holes forces a compromise of the aerodynamics to accommodate straight holes. One design alternative to the radial cooling holes is to bleed cooling flow to form a film-cooling layer over the blade.

The coolant for the internal cooling of the blades typically comes from a cooler temperature part of the gas turbine or from a separate source of cooling. The coolant is typically either an air-based coolant or a steam-based coolant. The air-based coolant is typically bled either from the compressor section or from a post-compressor region that surrounds the combustion section that is operating at a cooler temperature than the turbine blades and blade covers of concern. The air-based coolant is alternately supplied from a separate off-machine located air supply system. The steam-based coolant is typically supplied from a turbine section that is operating at a cooler temperature than the turbine blades of concern or the steam-based coolant can be supplied from an independent steam supply (i.e. other steam system or auxiliary boiler). However, providing the air-based coolant to internally cool the turbine blades represents internal work to the gas turbine that reduces the net output power of the gas turbine. Additionally, the issues related to directing the flow of the air-based coolant to the areas of highest heat load in the turbine blade has created the desire to improve the internal cooling of the blades even further.

Accordingly, there is a need for an improved turbine blade. What is needed is a turbine blade core cooling apparatus that allows more aggressively shaped aerodynamic blade configurations, promotes lighter blade internal construction, maintains the structural support of the turbine blade, delivers higher cooling effectiveness, and lowers sensitivity to wall thickness variations by placing cooling air very near all external surfaces of the turbine blade. What is also needed is an internal cooling scheme that satisfies the turbine blade cooling requirements with less impact on the turbine net output.

SUMMARY

The present invention provides a cooling apparatus for cooling a turbine blade. The cooling apparatus comprises a pressure side plate comprising a plurality of pressure ribs, a suction side plate comprising a plurality of suction ribs, and a plurality of flow redirection areas. The pressure side plate is disposed over the suction side a plate, where the pressure ribs are disposed at a first angle with respect to a blade span reference line and the suction ribs are disposed at a second angle with respect to the blade span reference line, to form the flow redirection areas.

The present invention provides a method of fabricating the cooling apparatus for the turbine blade comprising aligning the pressure side plate and the suction side plate to form the plurality of flow redirection areas between the pressure side plate and the suction side plate.

DRAWINGS

These and other features, aspects, and advantages of the present invention will become better understood when the following detailed description is read with reference to the accompanying drawings in which like characters represent like parts throughout the drawings, wherein.

Figure 4:
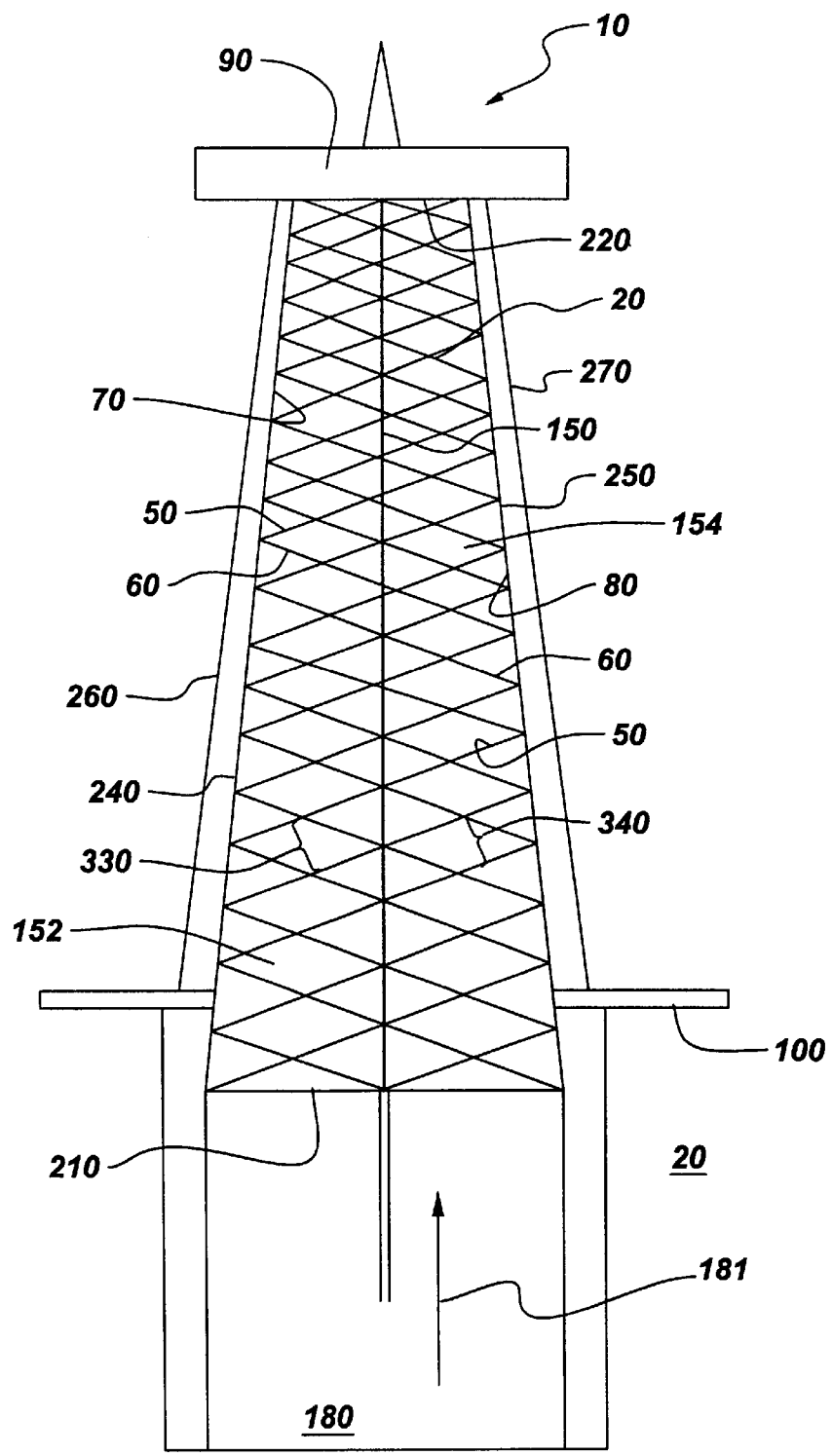
Figure 5:
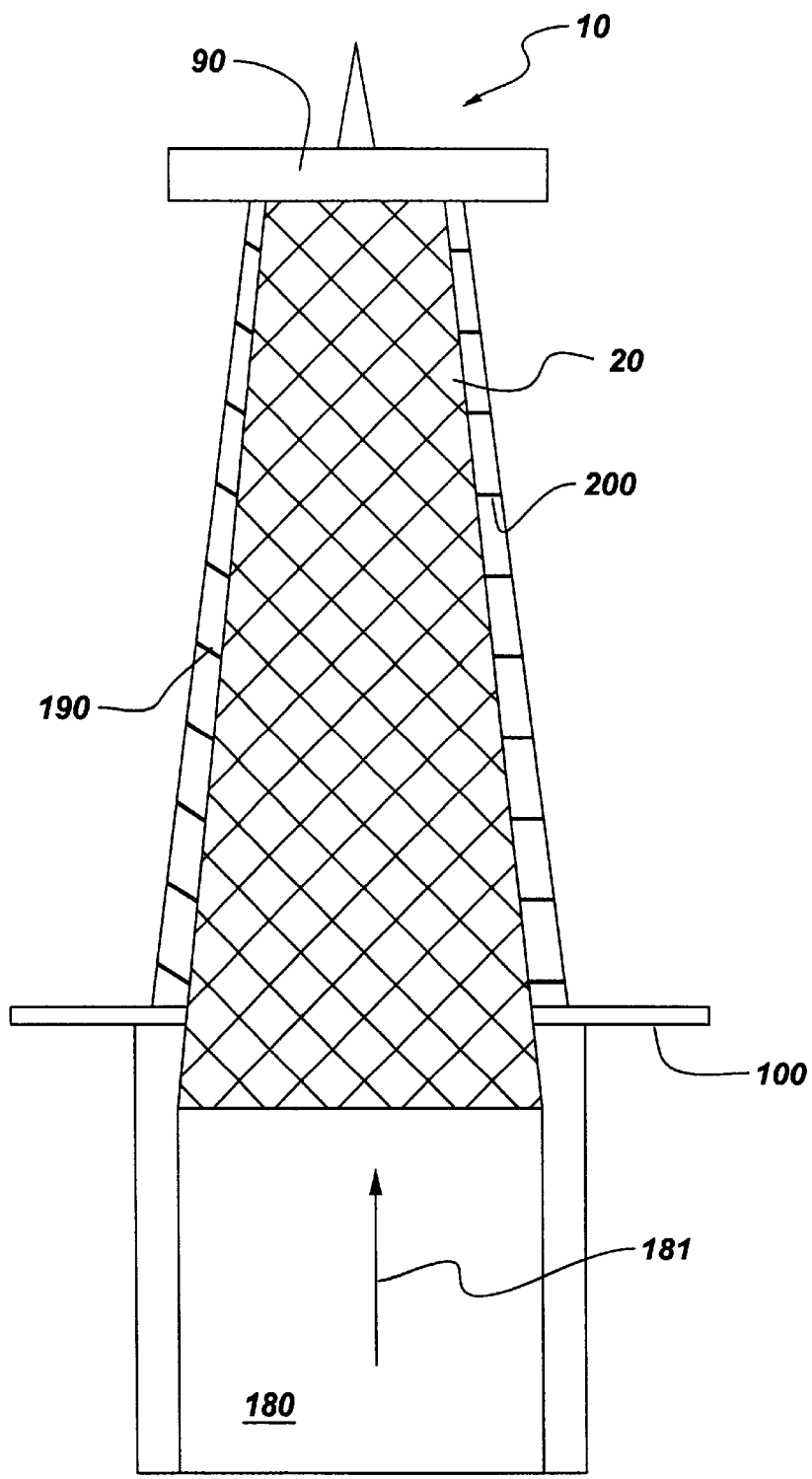
Figure 6:
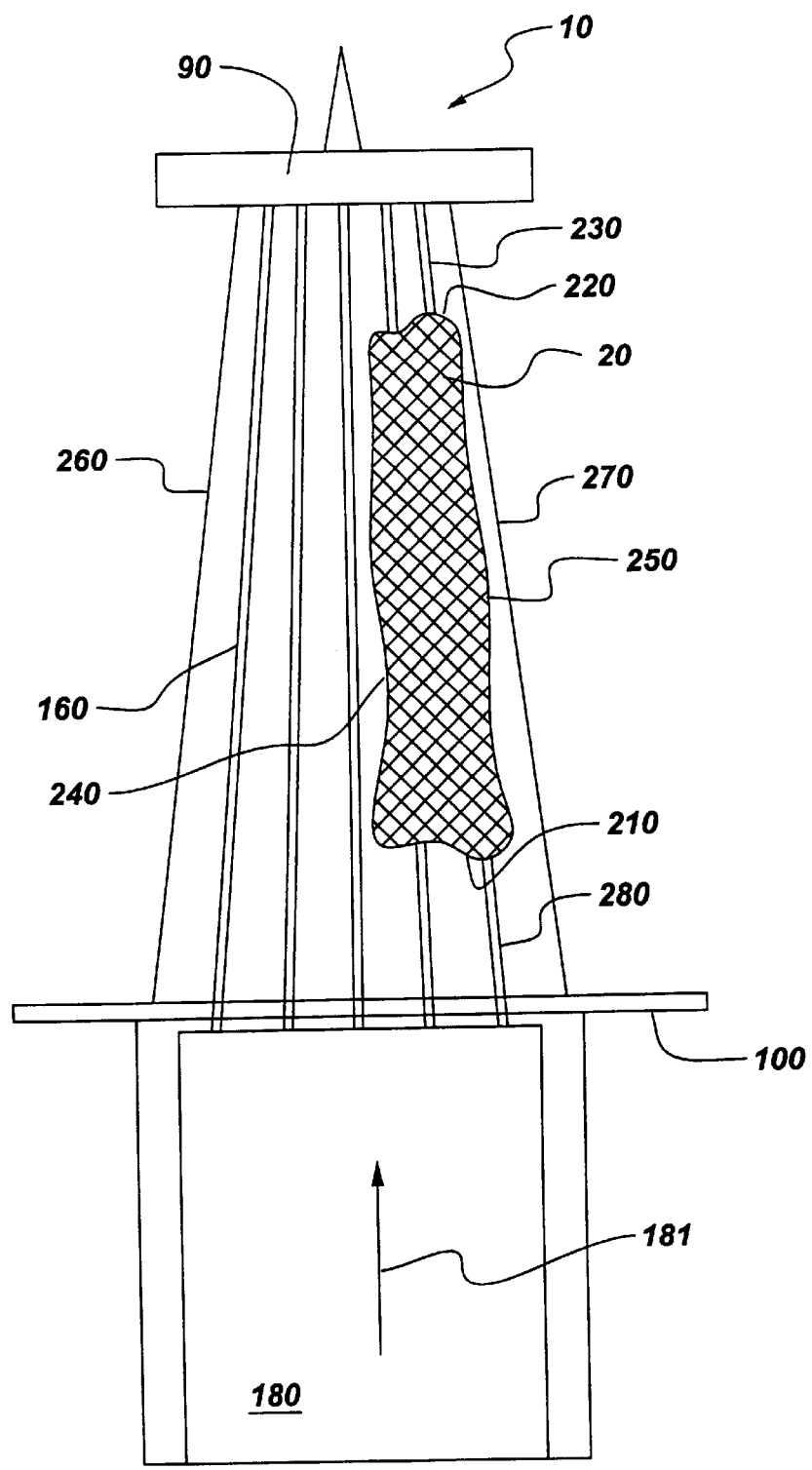
Figure 7:
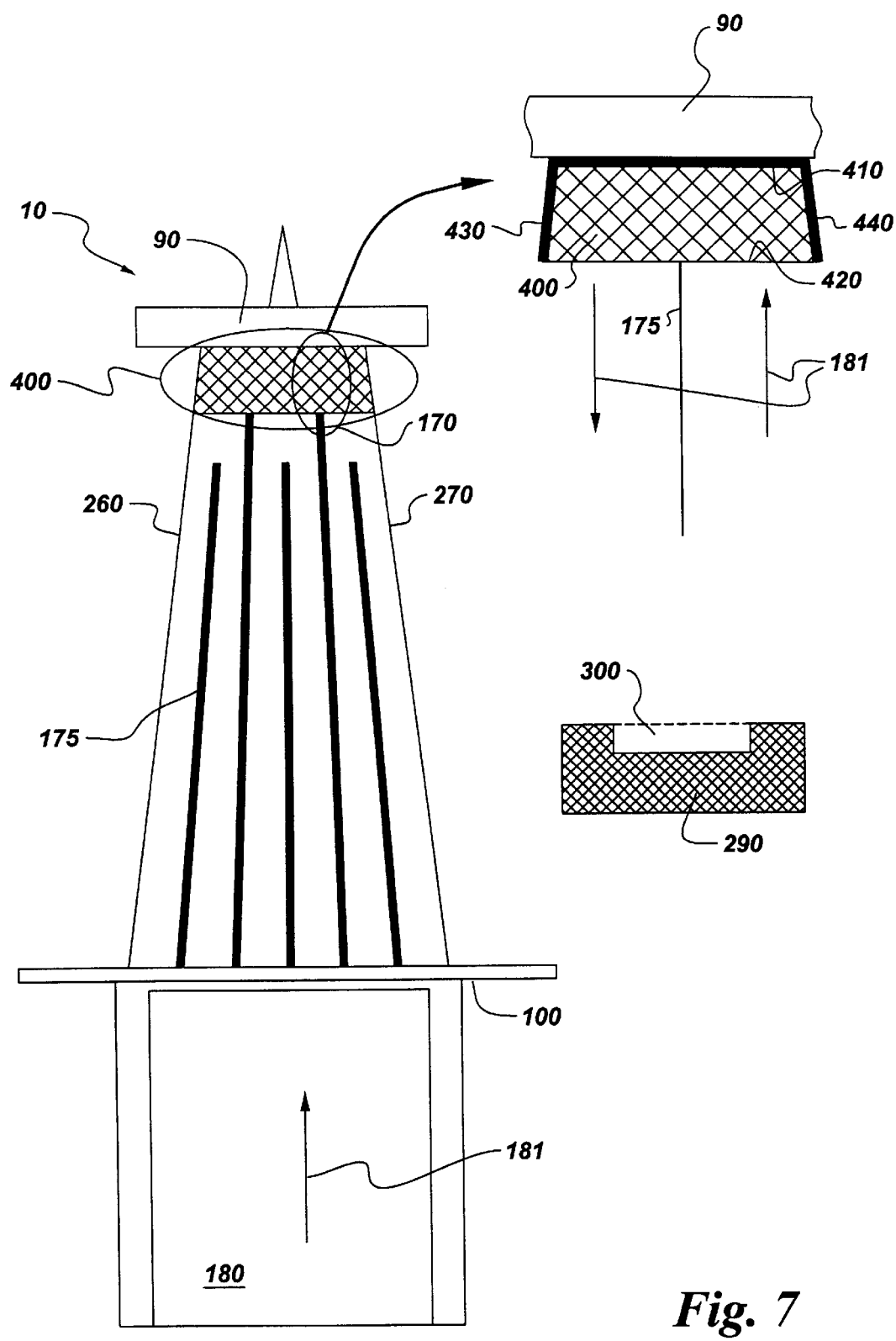
Figure 8:
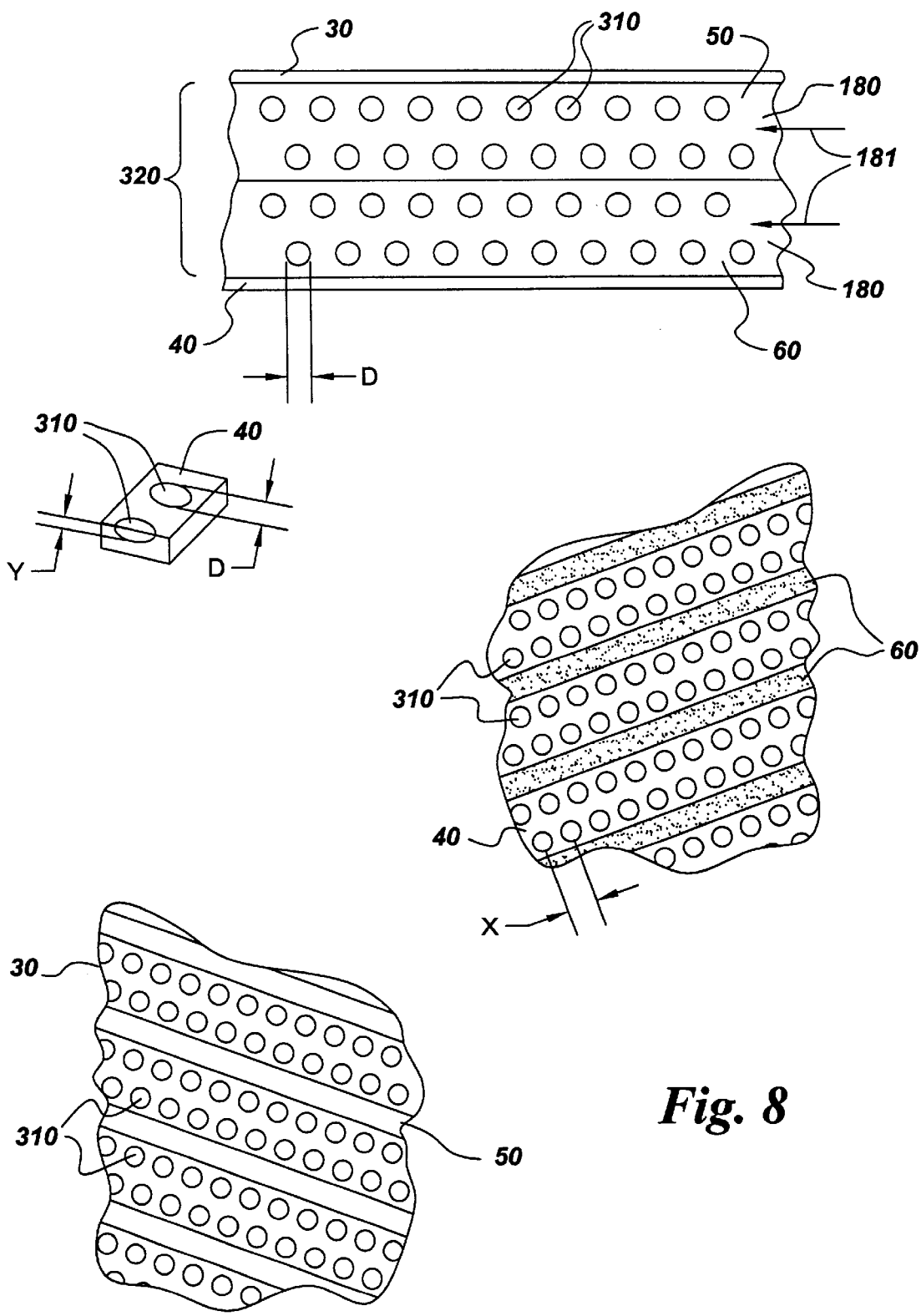

FIG. 4 a cross sectional view of the turbine blade comprising the leading edge cooling section and the trailing edge cooling section in accordance with one embodiment of the present invention;

FIG. 5 a cross sectional view of the turbine blade comprising leading edge cooling ejections and trailing edge cooling ejections;

FIG. 6 is a cross sectional view of the turbine blade comprising the cooling apparatus in accordance with one embodiment of the present invention;

FIG. 7 is a cross sectional view of the turbine blade comprising the tip turning cooling apparatus in accordance with one embodiment of the present invention; and FIG. 8 is a cross sectional view of the cooling apparatus in accordance with one embodiment of the present invention.

DESCRIPTION

Figure 1:
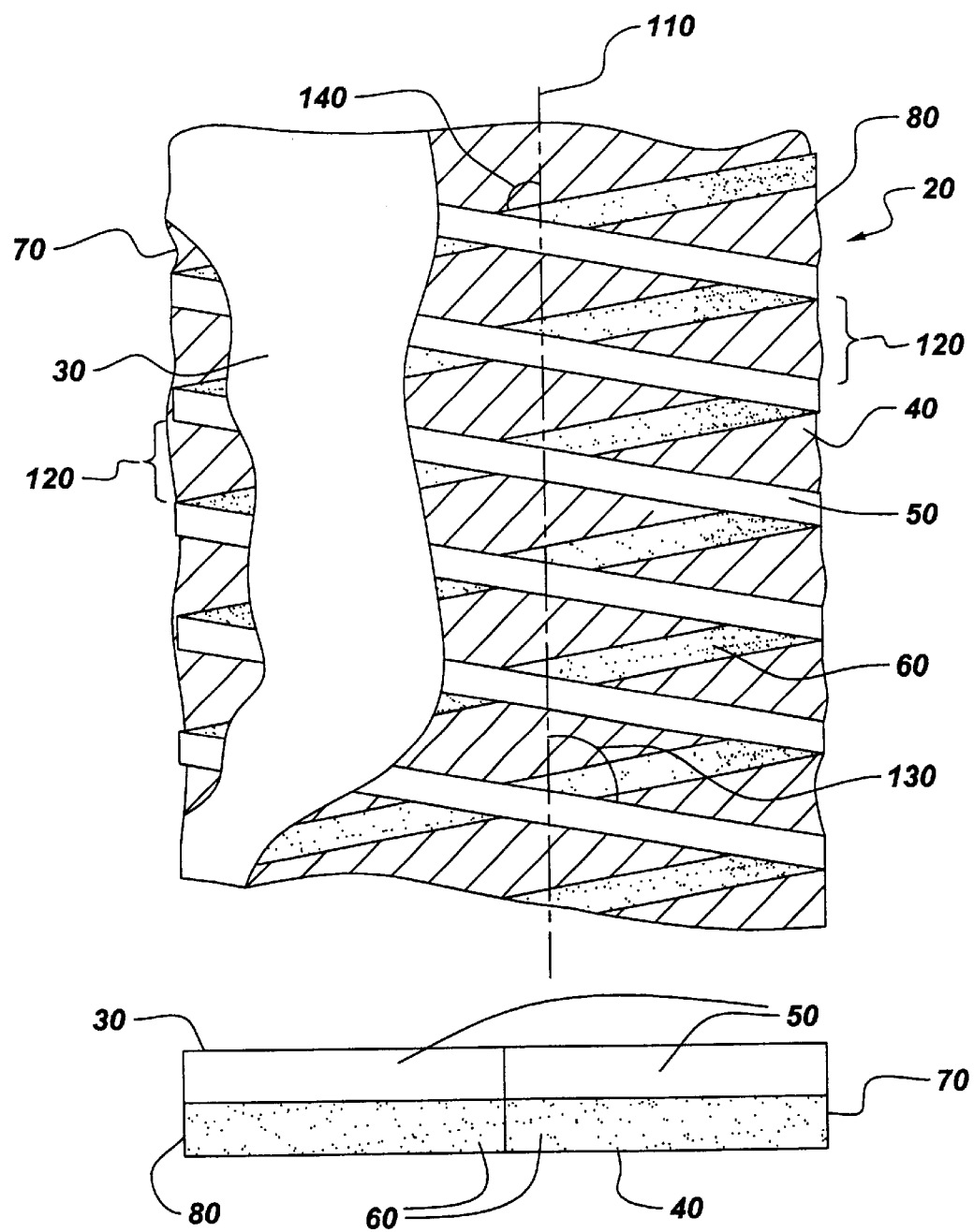
FIG. 1 is a cross sectional view of the cooling apparatus in accordance with one embodiment of the present invention.
Figure 2:
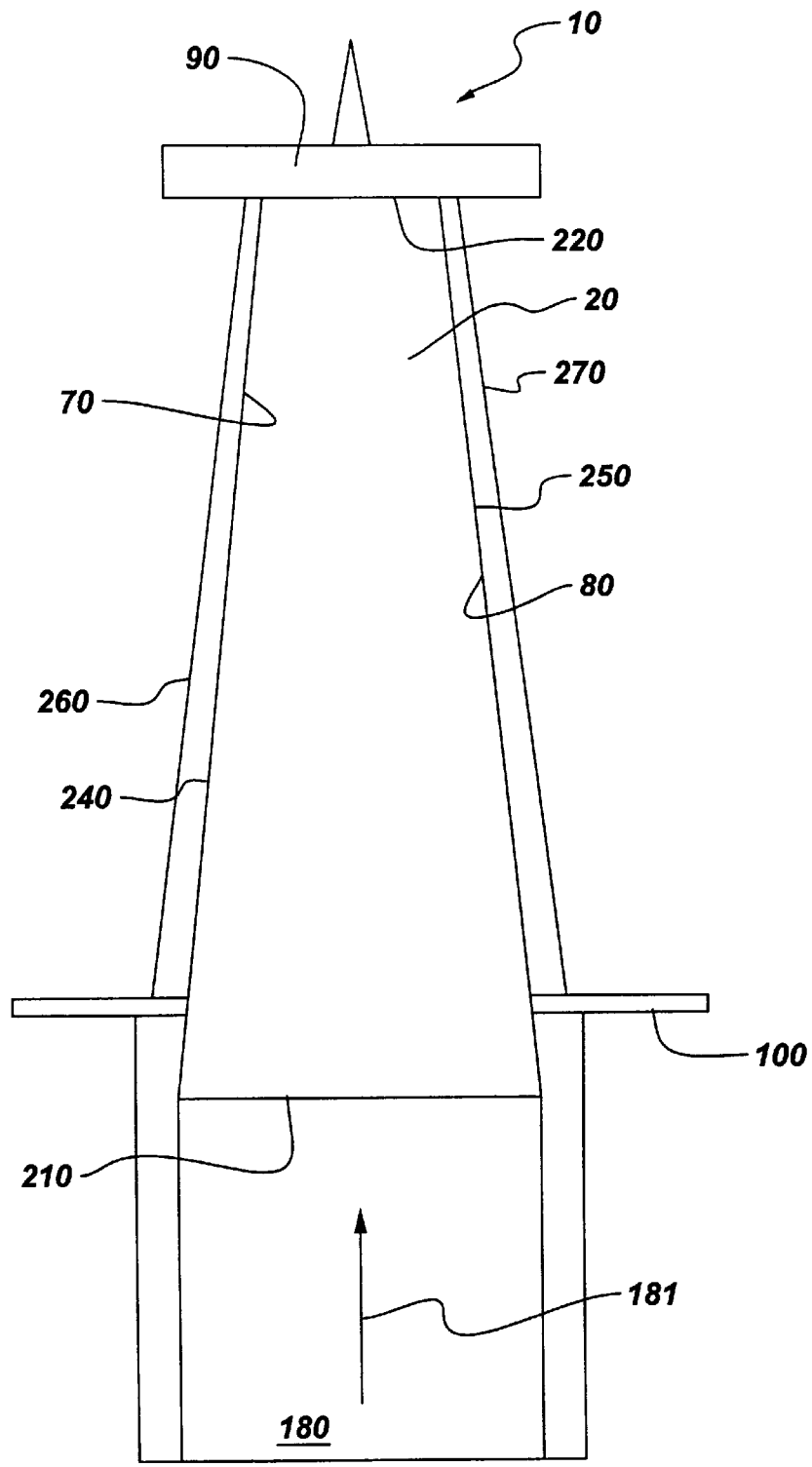
FIG. 2 is a cross sectional view of the turbine blade comprising the cooling apparatus in accordance with one embodiment of the present invention.

FIG. 1 provides a cross sectional view of a portion of the cooling apparatus 20 for cooling the turbine blade 10 of FIG. 2. The cooling apparatus 20 of FIG. 1 comprises the pressure side plate 30. The pressure side plate 30 comprises the plurality of pressure ribs 50. The cooling apparatus 20 further comprises the suction side plate 40. The suction side plate 40 comprises a plurality of suction ribs 60.

The pressure side plate 30 is disposed over the suction side plate 40. The pressure ribs 50 are disposed at the first angle 130 with respect to the blade span reference line 110 and the suction ribs 60 are disposed at the second angle 140 with respect to the blade span reference line 110 to form the flow redirection areas 120.

As used herein, the term "turbine blade" refers to both steam turbine blades and gas turbine blades. As used herein, the term "blade span reference line" refers to a reference axis and not a physical part of turbine blade 10 of FIG. 2 or the cooling apparatus 20 of FIG. 1. As used herein, the terms "disposed on", "disposed from", "disposed to", "disposed over", "disposed above" and the like are used to refer to relative locations of items illustrated in the drawings and do not imply structural or operational limitations in the assembled device. As used herein, the term "flow redirection area" is related to an area where the coolant 180 of FIG. 2 turns to flow from the pressure side plate 30 to the suction side plate 40. Additionally, as used herein, the term "flow redirection area" is related to an area where the coolant 180 of FIG. 2 turns to flow from the suction side plate 40 to the pressure side plate 30.

In one embodiment of the present invention, the first angle 130 has a range from about 25 degrees to about 55 degrees, and the second angle 140 has a range from about −25 to about −55 degrees. In another embodiment of the present invention, the first angle 130 has a range from about 40 degrees to about 45 degrees, and the second angle 140 has a range from about −40 to about −45 degrees. In another embodiment of the present invention, the first angle 130 has a range from about −25 degrees to about −55 degrees, and the second angle 140 has a range from about 25 to about 55 degrees. In another embodiment of the present invention, the first angle 130 has a range from about −40 degrees to about −45 degrees, and the second angle 140 has a range from about 40 to about 45 degrees.

In one embodiment of the present invention, the cooling apparatus 20 further comprises a leading edge cover 70 and a trailing edge cover 80, and the pressure side plate 30, the suction side plate 40, the leading edge cover 70, and the trailing edge cover 80 are disposed in an investment casting.

Coolant direction arrows 181 in FIGS. 2–7 generally indicate the coolant direction.

FIG. 2 depicts a specific embodiment of the present invention, in which the cooling apparatus 20 is disposed from about a blade root 100 to about a blade cover 90. In the embodiment of FIG. 2, the lower edge 210 of the cooling apparatus 20 can be disposed to be above or below the elevation of the blade root 100 depending on the strength and cooling requirements required by the application and the upper edge 220 of the cooling apparatus 20 is disposed to be at or below the elevation of the blade cover 90 depending on the strength and cooling requirements required by the application. The artisan determines the final arrangement of the lower edge 210, and the present invention is not limited to the positioning of the lower edge 210 or the upper edge 220 of the cooling apparatus 20 that is shown in FIG. 2.

A cooling apparatus leading edge 240 of the cooling apparatus 20 can be disposed on or spaced apart from the turbine blade leading edge 260 depending on the strength and cooling requirements required by the application and the final arrangement is determined by the artisan. The present invention in no way implies a limitation as to the positioning of the cooling apparatus leading edge 240 of the cooling apparatus 20.

A cooling apparatus trailing edge 250 of the cooling apparatus 20 can be disposed on or spaced apart from the turbine blade trailing edge 270 depending on the strength and cooling requirements required by the application and the final arrangement is determined by the artisan. The present invention in no way implies a limitation as to the positioning of the cooling apparatus trailing edge 250 of the cooling apparatus 20.

Figure 3:
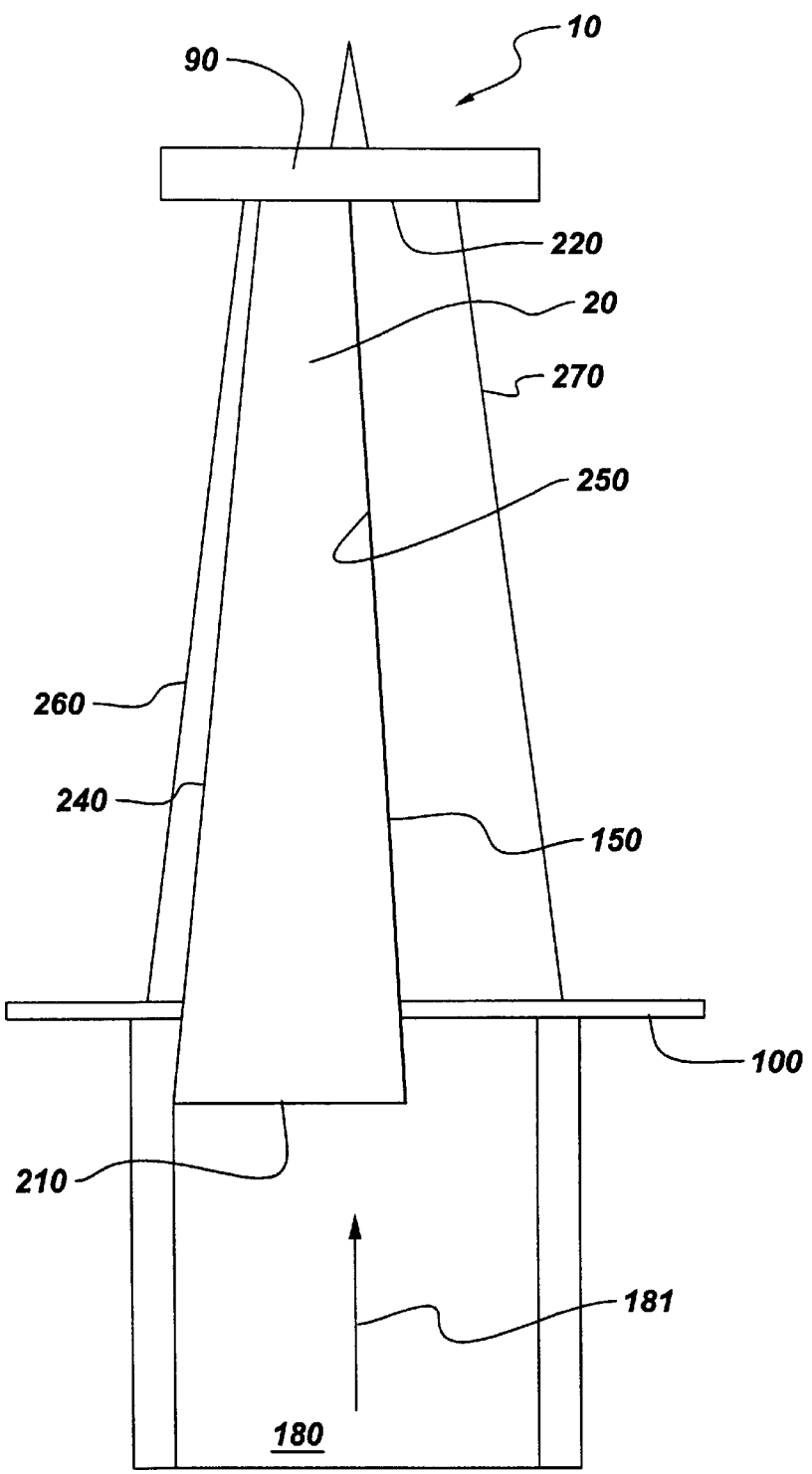
FIG. 3 is a cross sectional view of the turbine blade comprising the cooling apparatus in accordance with one embodiment of the present invention.

FIG. 3 provides another embodiment of the present invention the cooling apparatus 20 further comprising a dividing rib 150 disposed from the pressure side plate 30 to the suction side plate 40. The dividing rib 150 is disposed to separate the flow of the coolant 180 in the turbine blade 10. Additionally, the dividing rib 150 is disposed from the blade root 100 to the blade cover 90. In one embodiment of the present invention, the dividing rib 150 is spaced apart from the turbine blade trailing edge 270. In a still more specific embodiment of the present invention, the lower edge 210 of the cooling apparatus 20 is disposed at the blade root 100, the upper edge 220 of the cooling apparatus 20 is disposed to the blade cover 90, the cooling apparatus leading edge 240 is disposed to a turbine blade leading edge 260, and the cooling apparatus trailing edge 250 is disposed to the dividing rib 150.

In another embodiment of the present invention, the lower edge 210 is disposed at about the blade root 100 and the upper edge 220 is disposed to the blade cover 90. The dividing rib 150 is disposed from the pressure side plate 30 to the suction side plate 40, and the dividing rib 150 is disposed from about the blade root 100 to about the blade cover 90 as discussed above. The dividing rib 150 in this embodiment is spaced apart from the turbine blade leading edge 260 (not shown in FIG. 3); the cooling apparatus trailing edge 250 is disposed to the turbine blade trailing edge 270 (not shown in FIG. 3), and the cooling apparatus leading edge 240 is disposed to the dividing rib 150 (not shown in FIG. 3).

As used herein, the term "dividing rib" is used to describe an element that is disposed adjacent to at least a portion of the cooling apparatus 20 on either the cooling apparatus leading edge 240 or the cooling apparatus trailing edge 250. In one embodiment, the dividing rib 150 is disposed such that it is spaced apart from both the turbine blade leading edge 260 and the turbine blade trailing edge 270. In one embodiment, the dividing rib 150 is disposed such that it is spaced apart from the turbine blade leading edge 260. In one embodiment, the dividing rib 150 is disposed such that it is spaced apart from the turbine blade trailing edge 270.

As depicted in FIG. 4, in an alternative embodiment of the present invention, at least one dividing rib 150 divides the cooling apparatus 20 into at least two sections (i.e. leading edge cooling section 152 and trailing edge cooling section 154). While FIG. 4 depicts splitting the cooling apparatus 20 into two sections, in other embodiments, for example, multiple dividing ribs are used to split the cooling apparatus 20 into three or more cooling sections.

The dividing rib 150 is disposed from the pressure side plate 30 to the suction side plate 40. The dividing rib 150 is disposed form about the blade root 100 to about the blade cover 90. The dividing rib 150 divides the cooling apparatus 20 into a leading edge cooling section 152 and a trailing edge cooling section 154. The present invention does not imply a limitation as to the number of dividing ribs 150 that are utilized or to the positioning of the plurality of dividing ribs 150 as these variables are left for the artisan to determine based upon the specific turbine blade application. In another embodiment of the present invention, the pressure side plate 30, the suction side plate 40, the leading edge cover 70, the trailing edge cover 80, the dividing rib 150, the leading edge cooling section 152, and the trailing edge cooling section 154 are disposed in the investment casting.

In one embodiment of the present invention, the leading edge cooling section 152 has a first rib spacing 330 and the trailing edge cooling section 154 has a second rib spacing 340. The first rib spacing 330 and the second rib spacing 340 are disposed to control a flow of the coolant 180 in the leading edge cooling section 152 and the trailing edge cooling section 154, respectively. The artisan is left to determine the final rib spacing in each cooling section based on the flow requirements and the allowable pressure drop for the each respective cooling section. Typically, wider rib spacing is associated with a lower pressure compared to a more narrow rib spacing.

The present invention recognizes the usefulness of employing greater than two cooling sections. The number of cooling sections, the commensurate number of dividing ribs 150, the rib spacing selections, first angle selections, second angle selections, and the exact positioning of the cooling sections is left for the artisan to determine based on satisfying the specific turbine blade cooling application requirements.

As shown in FIG. 5, in an alternative embodiment of the present invention, the leading edge cooling section 152 is further disposed with at least one of the plurality of flow redirection areas 120 substantially aligned with at least one leading edge cooling ejection 190 of the turbine blade 10. In another embodiment of the present invention, the trailing edge cooling section 154 is further disposed with at least one other of the plurality of flow redirection areas 120 substantially aligned with at least one trailing edge cooling ejection 200. In another embodiment of the present invention, the blade cover 90 further comprises at least one blade cover cooling ejection 95, where each of the at least one blade cover cooling ejections 95 is further disposed to one of the plurality of flow redirection areas 120 disposed in the blade cooling apparatus 20. While not shown in FIG. 5, the present invention does not imply any limitation to providing ejections that are along any portion of the pressure side plate 30, the suction side plate 40, the blade cover 90, and any combination thereof to provide film cooling where the artisan deems necessary based on application specific determinations. The use, exact placement, and combination of the ejections are left to the artisan to determine in response to specific turbine blade cooling requirements.

In one embodiment of the present invention as shown in FIG. 6, the upper edge 220 of the cooling apparatus 20 is spaced apart from the blade cover 90 and the lower edge 210 of the cooling apparatus 20 is spaced apart from the blade root 100. The cooling apparatus trailing edge 250 is disposed to the turbine blade trailing edge 270, where the cooling apparatus leading edge 240 is spaced apart from the turbine blade leading edge 260. The at least one lower channel 280 is disposed to provide a path for the coolant 180 from the lower edge 210 of the cooling apparatus 20 to the blade root 100. The at least one upper channel 230 is disposed to provide a path for the coolant 180 from the upper edge 220 of the cooling apparatus 20 to the blade cover 90.

The present invention recognizes that the cooling apparatus 20 can be effectively located in various locations in the turbine blade. The following embodiments are provided with modifications noted compared to the embodiment depicted in FIG. 6.

In other embodiment of the present invention, the cooling apparatus 20 can be located so that the upper edge 220 of the cooling apparatus 20 is disposed adjacent a blade cover 90 (not shown in FIG. 6). The cooling apparatus leading edge 240 of FIG. 6 is disposed to the turbine blade leading edge 260 (not shown in FIG. 6).

In one embodiment of the present invention, the cooling apparatus 20 can be located so that the lower edge 210 of the cooling apparatus 20 is disposed at the blade root 100 (not shown in FIG. 6). The cooling apparatus leading edge 240 of FIG. 3 is disposed to a turbine blade leading edge 260 (not shown in FIG. 6).

In one embodiment of the present invention, the cooling apparatus 20 can be located so that the cooling apparatus leading edge 240 of FIG. 3 is disposed to a turbine blade leading edge 260 (not shown in FIG. 6).

In one embodiment of the present invention, the cooling apparatus 20 can be located so that the lower edge 210 of the cooling apparatus 20 is disposed at the blade root 100 (not shown in FIG. 6).

In one embodiment of the present invention, the cooling apparatus 20 can be located so that the lower edge 210 of the cooling apparatus 20 is disposed at the blade root 100 (not shown in FIG. 6). The cooling apparatus leading edge 240 is disposed to the turbine blade leading edge 260 (not shown in FIG. 6). The cooling apparatus trailing edge 250 is disposed to be spaced apart from the turbine blade trailing edge 270 (not shown in FIG. 6).

In one embodiment of the present invention, the cooling apparatus 20 can be located so that the upper edge 220 of the cooling apparatus 20 is disposed at the blade cover 90 (not shown in FIG. 6).

In one embodiment of the present invention, the cooling apparatus 20 can be located so that the upper edge 220 of the cooling apparatus 20 is disposed at the blade cover 90 (not shown in FIG. 6). The cooling apparatus leading edge 240 is disposed to the turbine blade leading edge 260 (not shown in FIG. 6). The cooling apparatus trailing edge 250 is disposed to be spaced apart from a turbine blade trailing edge 270 (not shown in FIG. 6).

In one embodiment of the present invention, the cooling apparatus 20 can be located so that the cooling apparatus leading edge 240 is disposed to the turbine blade leading edge 260 (not shown in FIG. 6). The cooling apparatus trailing edge 250 is disposed to be spaced apart from a turbine blade trailing edge 270 (not shown in FIG. 6).

In one embodiment of the present invention, the cooling apparatus 20 can be located so that the cooling apparatus trailing edge 250 is disposed to be spaced apart from a turbine blade trailing edge 270 (not shown in FIG. 6).

In one embodiment of the present invention, both the at least one lower channel 280 and the at least one upper channel 230 are produced by processes selected from the group consisting of Electro-Chemical Machining (ECM), Shaped-Tube Electro-Chemical Machining (STEM), Pulsed Electro-Chemical Machining (PECM), casting, and combinations thereof.

In one embodiment of the present invention as shown in FIG. 7, the cooling apparatus 20 is a tip turning cooling apparatus 400 disposed in the tip turning region 170. A tip turning upper edge 410 of the tip turning cooling apparatus 400 is disposed at the blade cover 90 and a tip turning lower edge 420 of the tip turning cooling apparatus 400 is spaced apart from the blade root 100. A tip turning leading edge 430 of the tip turning cooling apparatus 400 is disposed to a portion of the turbine blade leading edge 260 and a tip turning trailing edge 440 of the tip turning cooling apparatus 400 is disposed to a portion of the turbine blade trailing edge 270. At least one portion of the tip turning lower edge 410 is disposed to be in communication to the blade root 100 through at least one divider 175. The divider 175 is disposed to control the flow of the coolant 180 through the turbine blade 10. The sizing of the tip turning cooling apparatus 400 is determined by the artisan to accommodate cooling in the higher heat load areas of the turbine blade 10 adjacent the blade cover 90.

In one embodiment of the present invention, as described above with reference to FIG. 7, the tip turning cooling apparatus 400 further comprises a targeted flow cooling apparatus 290, which has a target area 300. The pressure ribs 50 and the suction ribs 60 are spaced apart from the target area 300. The target area 300 is an open area that offers lower flow resistance to the coolant 180 compared to the other areas of the tip turning cooling apparatus 400. The sizing of targeted flow cooling apparatus 290 and the target area 300 is determined by the artisan to balance the requirements for cooling in the higher heat load areas of the turbine blade 10 adjacent the blade cover 90 with the constraints of maintaining pressure drops of the coolant 180 through the turbine blade 10.

In one embodiment as shown in FIG. 8 a plurality of surface concavities 310 are disposed on at least one of the pressure side plate 30, suction side plate 40, pressure rib 50, and suction rib 60 that faces the coolant 180. As used herein, the term "concavity" refers to depressions, indentations, dimples, pits or any other type or shape of a discrete sinkhole. In one embodiment, the shape of concavities 310 is typically hemispherical or inverted and truncated conically shaped. In an alternative embodiment, the shape of concavities 310 is typically any sector of a full hemisphere. In some embodiments, the concavities 310 are disposed on the entirety or a portion of at least one surface that is disposed to contact the coolant 180 of any of the following elements: 1) the pressure side plate 30, 2) the suction side plate 40, 3) the pressure rib 50, and 4) suction rib 60.

The concavities 310 are formed on the abovementioned surface or surfaces in a pattern that serves to enhance heat transfer from at least one of the pressure side plate 30, suction side plate 40, pressure rib 50, and suction rib 60 to the coolant 180. The concavities 310 enhance the heat transfer by disrupting the flow of the coolant 180 past the surface that faces the coolant 180 of the pressure side plate 30, the suction side plate 40, the pressure rib 50, and the suction rib 60. The disruption of the coolant 180 adjacent to the concavities 310 is caused by the hydrodynamic interaction of the coolant 180 with the concavities 310. The resulting heat transfer rate is increased for at least one of the pressure side plate 30, suction side plate 40, pressure rib 50, and suction rib 60 and the coolant 180.

In one embodiment of the present invention, the maximum depth "Y" of each of the concavities 310 typically remains constant along the surface of the pressure side plate 30, suction side plate 40, pressure rib 50, and suction rib 60. The maximum depth "Y" is generally in the range from about 0.10 to about 0.50 times the concavity surface diameter "D". In addition, the maximum depth Y of the concavities 310 is in the range from about 0.002 inches to about 0.125 inches. The center-to-center spacing "X" of the concavities 310 is generally in the range from about 1.1 to about 2 times the surface diameter "D" of the concavities 310.

In one embodiment, the concavities are typically formed by using a pulse electrochemical machining (PECM) process. In an alternative embodiment, the concavities 310 are typically formed by using an electro-discharge machining (EDM) process. In an alternative embodiment, the concavities 310 are formed by modifying the surfaces of the ceramic core in an investment casting process.

The present invention provides a method embodiment of fabricating the cooling apparatus 20 for a turbine blade 10 comprising aligning the pressure side plate 30 and the suction side plate 40 to form the plurality of flow redirection areas 120 between the pressure side plate 30 and the suction side plate 40. The pressure plate 30 comprises the plurality of pressure ribs 50 disposed at the first angle 130 with respect to the blade span reference line 110. The suction side plate 40 comprises the plurality of suction ribs 60 disposed at the second angle 140 with respect to the blade span reference line 110.

The method utilizes the ranges provided above for the first angle 130 and the second angle 140.

In one embodiment of the present invention, the above discussed method further comprises, prior to aligning, fabricating the pressure side plate 30 and the suction side plate 40 by the process selected from a group consisting of investment casting, diffusion bonding, electron beam deposition, and any combination thereof.

In one embodiment of the present invention, in the above discussed method, aligning comprises providing an investment casting mold and investment core which comprises the flow redirection areas 120, the pressure ribs 50, and the suction ribs 60; and pouring a blade material so as to form an investment casting. The investment casting comprises the pressure side plate 30, the suction side plate 40, the pressure ribs 50, and the suction ribs 60. In a specific embodiment of the present invention, the investment casting comprises both the pressure side and the suction side plates in a single mold, where in the investment core defines the pressure ribs and the suction ribs in an aligned manner. In another specific embodiment of the present invention, the above-discussed method further comprises forming separate investment casting pieces for the pressure side plate and the suction side plate, aligning the separate investment casting pieces, and joining the separate investment casting pieces together. In another embodiment of the present invention, the above-discussed method further comprises forming the blade root 100 and the blade cover 90 of the turbine blade 10 as part of the investment casting. In another specific embodiment of the present invention, the above-discussed method further comprises forming the at least one upper channel 230 to provide a path for the coolant 180 from the upper edge 220 of the cooling apparatus 20 to the blade cover 90 as part of the investment casting. In another specific embodiment of the present invention, the above-discussed method further comprises forming the at least one lower channel 280 to provide a path for the coolant 180 from the lower edge 210 of the cooling apparatus 20 to the blade root 100 as part of the investment casting.

In one embodiment of the present invention, in the above-discussed method, aligning comprises joining the pressure side plate 30 and the suction side plate 40.

In one embodiment of the present invention, in the above discussed method, the cooling apparatus 20 is disposed from about the blade root 100 to about the blade cover 90 of the turbine blade 10.

In one embodiment of the present invention, with respect to the above discussed method, the method further comprises configuring at least one surface of the pressure rib 50 that is disposed to contact the coolant 180 with a plurality of concavities 310 thereon.

In one embodiment of the present invention, with respect to the above discussed method, the method further comprises configuring at least one surface of the suction rib 60 that is disposed to contact the coolant 180 with a plurality of concavities 310 thereon.

In one embodiment of the present invention, with respect to the above discussed method, the method further comprises configuring at least one surface of the pressure side plate 30 that is disposed to contact the coolant 180 with a plurality of concavities 310 thereon.

In one embodiment of the present invention, with respect to the above discussed method, the method further comprises configuring at least one surface of the suction side plate 40 that is disposed to contact the coolant 180 with a plurality of concavities 310 thereon.

In one embodiment of the present invention, with respect to the above discussed method, the method further comprises inserting the dividing rib 150 from about the pressure side plate 30 to about the suction side plate 40, where the dividing rib 150 divides the cooling apparatus 20 into the leading edge cooling section 152 and the trailing edge cooling section 154.

In one embodiment of the present invention, with respect to the above discussed method, the method further comprises spacing the pressure ribs 50 and the suction ribs 60 in a first rib spacing 330 for the leading edge cooling section 152; and spacing the pressure ribs 50 and the suction ribs 60 in a second rib spacing 340 for the trailing edge cooling section 154. The first rib spacing 330 and the second rib spacing 340 are disposed to control the flow of the coolant 180 in the leading edge cooling section 152 and the trailing edge cooling section 154, respectively.

In one embodiment of the present invention, with respect to the above-discussed method, the method further comprises configuring the turbine blade 10 with at least one ejection to vent the coolant 180. In one specific embodiment of the present invention the ejection is selected from the group consisting of the at least one leading edge cooling ejections 190 disposed on the leading edge cooling section 152, the at least one trailing edge cooling ejections 200 disposed on the trailing edge cooling section 154, at least one blade cover cooling ejection 95, and any combination thereof. In one embodiment of the present invention, the at least one blade cover cooling ejection 95 is disposed to at least one surface of the blade cover 90 that is exposed to the working fluid. In the present invention, the working fluid is selected from the group consisting of steam, combustion gasses, and combinations thereof.

The present invention provides also provides a method of fabricating the cooling apparatus 20 for the turbine blade 10 comprising constructing a lattice structure 320, where the lattice structure 320 comprises the plurality of pressure ribs 50, the plurality of suction ribs 60, and the plurality of flow redirection areas 120. The method further comprises disposing the pressure ribs 50 at the first angle 130 with respect to the blade span reference line 110 and disposing the suction ribs 60 at the second angle 140 with respect to the blade span reference line 110. Additionally, the method comprises processing the lattice structure 320 so as to form the cooling apparatus 20, wherein the pressure side plate 30 comprises the pressure ribs 50, wherein the suction side plate 40 comprises the suction ribs 60. The method further comprises aligning the pressure side plate 30 over the suction side plate 40 to form the flow redirection areas 120. The method further comprises forming the trailing edge cover 80 and the leading edge cover 70, and disposing the cooling apparatus 20 from about the blade root 100 to about the blade cover 90.

The foregoing description of several embodiments of the present invention has been presented for purposes of illustration. Although the invention has been described and illustrated in detail, it is to be clearly understood that the same is intended by way of illustration and example only and is not to be taken by way of limitation. Obviously many modifications and variations of the present invention are possible in light of the above teaching. Accordingly, the spirit and scope of the present invention are to be limited only by the terms of the appended claims.

What is claimed is:

1. A cooling apparatus for cooling a turbine blade comprising:

a pressure side plate comprising a plurality of pressure ribs;

a suction side plate comprising a plurality of suction ribs;

a plurality of flow redirection areas;

said pressure side plate disposed over said suction side plate;

wherein said pressure ribs are disposed at a first angle with respect to a blade span reference line and said suction ribs are disposed at a second angle with respect to a blade span reference line so as to form said flow redirection areas; and at least one dividing rib;

wherein said dividing rib is disposed from said pressure side plate to said suction side plate;

wherein said dividing rib divides said cooling apparatus into a leading edge cooling section and a trailing edge cooling section.

2. The apparatus of claim 1, wherein said first angle has a range from about 25 degrees to about 55 degrees, wherein said second angle has a range from about −25 to about −55 degrees.

3. The apparatus of claim 1, wherein said first angle has a range from about 40 degrees to about 45 degrees, wherein said second angle has a range from about −40 to about −45 degrees.

4. The apparatus of claim 1, wherein said first angle has a range from about −25 degrees to about −55 degrees, wherein said second angle has a range from about 25 to about 55 degrees.

5. The apparatus of claim 1, wherein said first angle has a range from about −40 degrees to about −45 degrees, wherein said second angle has a range from about 40 to about 45 degrees.

6. The apparatus of claim 1, wherein said cooling apparatus is disposed from about a blade root to about a blade cover.

7. The apparatus of claim 1 further comprising a leading edge cover and a trailing edge cover, wherein said pressure side plate, said suction side plate, said leading edge cover, and said trailing edge cover are disposed in an investment casting.

8. The apparatus of claim 1 further comprising a leading edge cover and a trailing edge cover, wherein said pressure side plate, said suction side plate, said leading edge cover, said trailing edge cover, said dividing rib, said leading edge cooling section, and said trailing edge cooling section are disposed in an investment casting.

9. The apparatus of claim 8 wherein said leading edge cooling section has a first rib spacing and said trailing edge cooling section has a second rib spacing, wherein said first rib spacing and said second rib spacings are disposed to control a flow of a coolant in said leading edge cooling section and said trailing edge cooling section, respectively.

10. A cooling apparatus for cooling a turbine blade comprising:

a pressure side plate comprising a plurality of pressure ribs;

a suction side plate comprising a plurality of suction ribs;

a plurality of flow redirection areas;

said pressure side plate disposed over said suction side plate;

wherein said pressure ribs re disposed at a first angle with respect to a blade span reference line and said suction ribs are disposed at a second angle with respect to said blade span reference line so as to form said flow redirection areas; and a blade cover and an at least one blade cover cooling ejection;

wherein said at least one of: said leading edge cooling section, said trailing edge cooling section, and said blade cover is further disposed with at least one of said plurality of flow redirection areas;

wherein said leading edge cooling section is aligned to an at least one leading edge cooling ejection;

wherein said trailing edge cooling section is aligned to an at least one trailing edge cooling ejection;

wherein said blade cover is aligned to said at least one blade cover cooling ejection.

11. A cooling apparatus for cooling a turbine blade comprising:

a pressure side plate comprising a plurality of pressure ribs;

a suction side plate comprising a plurality of suction ribs;

a plurality of flow redirection areas;

said pressure side plate disposed over said suction side plate;

wherein said pressure ribs are disposed at a first angle with respect to a blade span reference line and said suction ribs are disposed at a second angle with respect to said blade span reference line so as to form said flow redirection areas, wherein a lower edge of said cooling apparatus is disposed at a blade root and an upper edge of said cooling apparatus is disposed below a blade cover;

wherein said upper edge of said cooling apparatus is disposed to be in communication to said blade cover through at least one upper channel;

wherein a cooling apparatus leading edge is disposed to a turbine blade leading edge;

wherein a cooling apparatus trailing edge is disposed to a turbine blade trailing edge.

12. The apparatus of claim 11 wherein said at least one upper channel is produced by processes selected from the group consisting of Electro-Chemical Machining (ECM), Shaped-Tube Electro-Chemical Machining (STEM), Pulsed Electro-Chemical Machining (PECM), investment casting, and combinations thereof.

13. A cooling apparatus for cooling a turbine blade comprising:

a pressure side plate comprising a plurality of pressure ribs;

a suction side plate comprising a plurality of suction ribs;

a plurality of flow redirection areas;

said pressure side plate disposed over said suction side plate;

wherein said pressure ribs are disposed at a first angle with respect to a blade span reference line and said suction ribs are disposed at a second angle with respect to said blade span reference line so as to form said flow redirection areas;

wherein a lower edge of said cooling apparatus is disposed above a blade root and an upper edge of said cooling apparatus is disposed below a blade cover;

wherein said lower edge of said cooling apparatus is disposed to be in communication to said blade root through at least one lower channel;

wherein said upper edge of said cooling apparatus is disposed to be in communication to said blade cover through at least one upper channel;

wherein a cooling apparatus leading edge is disposed to a turbine blade leading edge;
wherein a cooling apparatus trailing edge is disposed to a turbine blade trailing edge.

14. The apparatus of claim 13 wherein said at least one lower channel and said at least one upper channel are produced by processes selected from the group consisting of Electro-Chemical Machining (ECM), Shaped-Tube Electro-Chemical Machining (STEM), Pulsed Electro-Chemical Machining (PECM), casting, and combinations thereof.

15. The apparatus of claim 13 wherein a lower edge of said cooling apparatus is disposed above a blade root and an upper edge of said cooling apparatus is disposed adjacent a blade cover;
wherein said lower edge of said cooling apparatus is disposed to be in communication to said blade root through at least one lower channel;
wherein a cooling apparatus leading edge is disposed to a turbine blade leading edge;
wherein a cooling apparatus trailing edge is disposed to a turbine blade trailing edge.

16. The apparatus of claim 15 wherein said at least one lower channel is produced by processes selected from the group consisting of Electro-Chemical Machining (ECM), Shaped-Tube Electro-Chemical Machining (STEM), Pulsed Electro-Chemical Machining (PECM), casting, and combinations thereof.

17. A cooling apparatus for cooling a turbine blade comprising:
a pressure side plate comprising a plurality of pressure ribs;
a suction side plate comprising a plurality of suction ribs;
a plurality of flow redirection areas;
said pressure side plate disposed over said suction side plate;
wherein said pressure ribs are disposed at a first angle with respect to a blade span reference line and said suction ribs are disposed at a second angle with respect to said blade span reference line so as to form said flow redirection areas;
wherein a lower edge of said cooling apparatus is disposed at a blade root and an upper edge of said cooling apparatus is disposed below a blade cover;
wherein a cooling apparatus leading edge is disposed to a turbine blade leading edge;
wherein a cooling apparatus trailing edge is disposed to be spaced apart from a turbine blade trailing edge;
wherein said upper edge of said cooling apparatus is disposed to be in communication to said blade cover through at least one upper channel.

18. The apparatus of claim 17, wherein an upper edge of said cooling apparatus is disposed at a blade cover and a lower edge of said cooling apparatus is disposed above a blade root;
wherein a cooling apparatus trailing edge is disposed to a turbine blade trailing edge;
wherein a cooling apparatus leading edge is disposed to be spaced apart from a turbine blade leading edge;
wherein said lower edge of said cooling apparatus is disposed to be in communication to said blade root through at least one lower channel.

19. A cooling apparatus for cooling a turbine blade comprising:
a pressure side plate comprising a plurality of pressure ribs;
a suction side plate comprising a plurality of suction ribs;
a plurality of flow redirection areas;
said pressure side plate disposed over said suction side plate;
wherein said pressure ribs are disposed at a first angle with respect to a blade span reference line and said suction ribs are disposed at a second angle with respect to said blade span reference line so as to form said flow redirection areas,
wherein said cooling apparatus is a tip turning cooling apparatus;
wherein a tip turning upper edge is disposed at a blade cover and a tip turning lower edge is disposed above a blade root;
wherein a tip turning leading edge is disposed to a portion of a turbine blade leading edge;
wherein a tip turning trailing edge is disposed to a portion of a turbine blade trailing edge;
wherein at least one portion of said tip turning lower edge is disposed to be in communication to said blade root through at least one divider.

20. The apparatus of claim 19, wherein said tip turning cooling apparatus further comprises a targeted flow cooling apparatus having a target area;
wherein said pressure ribs and said suction ribs are spaced apart form said target area.

21. A cooling apparatus for cooling a turbine blade comprising:
a pressure side plate comprising a plurality of pressure ribs;
a suction side plate comprising a plurality of suction ribs;
a plurality of flow redirection areas;
said pressure side plate disposed over said suction side plate;
wherein said pressure ribs re disposed at a first angle with respect to a blade span reference line and said suction ribs are disposed at a second angle with respect to said blade span reference line so as to form said flow redirection areas,
wherein at least one of said suction ribs that is disposed to contact a coolant has a plurality of concavities thereon.

22. The apparatus of claim 21, wherein said pressure side plate that is disposed to contact a coolant has a plurality of concavities thereon.

23. The apparatus of claim 21, wherein said suction side plate that is disposed to contact a coolant has a plurality of concavities thereon.

24. A method of fabricating a cooling apparatus for a turbine blade comprising:
aligning a pressure side plate, said pressure plate comprising a plurality of pressure ribs disposed at a first angle with respect to a blade span reference line, and a suction side plate comprising a plurality of suction ribs disposed at a second angle with respect to said blade span reference line, to form a plurality of flow redirection areas between said pressure side plate and said suction side plate,
configuring at least one of said suction ribs that is disposed to contact a coolant with a plurality of concavities thereon.

25. The method of claim 24 further comprising:
configuring said pressure side plate that is disposed to contact a coolant with a plurality of concavities thereon.

26. The method of claim 24 further comprising:
configuring said suction side plate that is disposed to contact a coolant with a plurality of concavities thereon.

27. A method of fabricating a cooling apparatus for a turbine blade comprising:
aligning a pressure side plate, said pressure plate comprising a plurality of pressure ribs disposed at a first angle with respect to a blade span reference line, and a suction side plate comprising a plurality of suction ribs disposed at a second angle with respect to said blade span reference line, to form a plurality of flow redirection areas between said pressure side plate and said suction side plate,
inserting a dividing rib from said pressure side plate to said suction side plate;
wherein said dividing rib divides said cooling apparatus into a leading edge cooling section and a trailing edge cooling section.

28. The method of claim 27, wherein said first angle has a range from about 25 degrees to about 55 degrees, wherein said second angle has a range from about −25 to about −55 degrees.

29. The method of claim 27, wherein said first angle has a range from about 40 degrees to about 45 degrees, wherein said second angle has a range from about −40 to about −45 degrees.

30. The method of claim 27, wherein said first angle has a range from about −25 degrees to about −55 degrees, wherein said second angle has a range from about 25 to about 55 degrees.

31. The method of claim 27, wherein said first angle has a range from about −40 degrees to about −45 degrees, wherein said second angle has a range from about 40 to about 45 degrees.

32. The method of claim 27, further comprising, prior to aligning, fabricating said pressure side plate and said suction side plate by the process selected from a group consisting of investment casting, diffusion bonding, electron beam deposition, and any combination thereof.

33. The method of claim 27, wherein aligning comprises providing an investment casting mold which comprises said flow redirection areas, said pressure ribs, and said suction ribs; and
a pouring a blade material so as to form an investment casting;
wherein said investment casting comprises said pressure side plate, said suction side plate, said pressure ribs, and said suction ribs.

34. The method of claim 27, wherein said cooling apparatus is disposed from about a blade root to about a blade cover of said turbine blade.

35. A method of fabricating a cooling apparatus for a turbine blade comprising:
aligning a pressure side plate, said pressure plate comprising a plurality of pressure ribs disposed at a first angle with respect to a blade span reference line, and a suction side plate comprising a plurality of suction ribs disposed at a second angle with respect to said blade span reference line, to form a plurality of flow redirection areas between said pressure side plate and said suction side plate,
disposing a blade cover over an upper edge of said cooling apparatus; and
disposing at least one of said leading edge cooling section, said trailing edge cooling section, and said blade cover with at least one of said plurality of flow redirection areas;
wherein said leading edge cooling section is aligned to an at least one leading edge cooling ejection;
wherein said trailing edge cooling section is aligned to an at least one trailing edge cooling ejection;
wherein said blade cover is aligned to an at least one blade cover cooling ejection.

36. The method of claim 35 further comprising:
constructing a lattice structure comprising the plurality of pressure ribs, the plurality of suction ribs, and a plurality of flow redirection areas, and
processing said lattice structure so as to form said cooling apparatus.

37. A method of fabricating a cooling apparatus for a turbine blade comprising:
constructing a lattice structure comprising a plurality of pressure ribs, a plurality of suction ribs, and a plurality of flow redirection areas, wherein said pressure ribs are disposed at a first angle with respect to a blade span reference line and said suction ribs are disposed at a second angle with respect to said blade span reference line;
processing said lattice structure so as to form said cooling apparatus, wherein a pressure side plate comprises said pressure ribs, wherein a suction side plate comprises said suction ribs;
aligning said pressure side plate over said suction side plate;
forming said flow redirection areas; and
forming a trailing edge cover and a leading edge cover;
disposing said cooling apparatus from about a blade root to about a blade cover;
inserting a dividing rib from said pressure side plate to said suction side plate, wherein said dividing rib divides said cooling apparatus into a leading edge cooling section and a trailing edge cooling section,
spacing said pressure ribs and said suction ribs in a first rib spacing for said leading edge cooling section; and
spacing said pressure ribs and said suction ribs in a second rib spacing for said trailing edge cooling section;
wherein said first rib spacing and said second rib spacings are disposed to control a flow of a coolant in said leading edge cooling section and said trailing edge cooling section, respectively;
configuring said leading edge cooling section with at least one leading edge cooling ejections; and
configuring said trailing edge cooling section with at least one trailing edge cooling ejections.

38. The method of claim 37 further comprising:
configuring at least one of said pressure ribs that is disposed to contact a coolant with a plurality of concavities thereon.

39. The method of claim 37 further comprising:
configuring at least one of said suction ribs that is disposed to contact a coolant with a plurality of concavities thereon.

40. The method of claim 37 further comprising:
configuring said pressure side plate that is disposed to contact a coolant with a plurality of concavities thereon.

41. The method of claim 37 further comprising:
configuring said suction side plate that is disposed to contact a coolant with a plurality of concavities thereon.

42. A cooling apparatus for cooling a turbine blade comprising:
- a pressure side plate comprising a plurality of pressure ribs;
- a suction side plate comprising a plurality of suction ribs;
- a plurality of flow redirection areas;
- said pressure side plate disposed over said suction side plate;
- wherein said pressure ribs are disposed at a first angle with respect to a blade span reference line and said suction ribs are disposed at a second angle with respect to said blade span reference line so as to form said flow redirection areas;
- a dividing rib;
- wherein said dividing rib is disposed from said pressure side plate to said suction side plate;
- wherein a lower edge of said cooling apparatus is disposed at a blade root and an upper edge of said cooling apparatus is disposed to a blade cover;
- wherein a cooling apparatus leading edge is disposed to a turbine blade leading edge;
- wherein a cooling apparatus trailing edge is disposed to said dividing rib;
- wherein said dividing rib is disposed from said blade root to said blade cover.

43. A cooling apparatus for cooling a turbine blade comprising:
- a pressure side plate comprising a plurality of pressure ribs;
- a suction side plate comprising a plurality of suction ribs;
- a plurality of flow redirection areas;
- said pressure side plate disposed over said suction side plate;
- wherein said pressure ribs are disposed at a first angle with respect to a blade span reference line and said suction ribs are disposed at a second angle with respect to said blade span reference line so as to form said flow redirection areas,
- a dividing rib;
- wherein said dividing rib is disposed from said pressure side plate to said suction side plate;
- wherein a lower edge of said cooling apparatus is disposed at a blade root and an upper edge of said cooling apparatus is disposed to a blade cover;
- wherein a cooling apparatus trailing edge is disposed to a turbine blade trailing edge;
- wherein a cooling apparatus leading edge is disposed to said dividing rib;
- wherein said dividing rib is disposed from said blade root to said blade cover.

44. A cooling apparatus for cooling a turbine blade comprising:
- a pressure side plate comprising a plurality of pressure ribs;
- a suction side plate comprising a plurality of suction ribs;
- a plurality of flow redirection areas;
- said pressure side plate disposed over said suction side plate;
- wherein said pressure ribs are disposed at a first angle with respect to a blade span reference line and said suction ribs are disposed at a second angle with respect to said blade span reference line so as to form said flow redirection areas,
- wherein a lower edge of said cooling apparatus is disposed at a blade root and an upper edge of said cooling apparatus is disposed below a blade cover;
- wherein a cooling apparatus trailing edge is disposed to a turbine blade trailing edge;
- wherein a cooling apparatus leading edge is disposed to be spaced apart from a turbine blade leading edge;
- wherein said upper edge of said cooling apparatus is disposed to be in communication to said blade cover through at least one upper channel.

45. A cooling apparatus for cooling a turbine blade comprising:
- a pressure side plate comprising a plurality of pressure ribs;
- a suction side plate comprising a plurality of suction ribs;
- a plurality of flow redirection areas;
- said pressure side plate disposed over said suction side plate;
- wherein said pressure ribs re disposed at a first angle with respect to a blade span reference line and said suction ribs are disposed at a second angle with respect to said blade span reference line so as to form said flow redirection areas,
- wherein an upper edge of said cooling apparatus is disposed at a blade cover and a lower edge of said cooling apparatus is disposed above a blade root;
- wherein a cooling apparatus leading edge is disposed to a turbine blade leading edge;
- wherein a cooling apparatus trailing edge is disposed to be spaced apart from a turbine blade trailing edge;
- wherein said lower edge of said cooling apparatus is disposed to be in communication to said blade root through at least one lower channel.

46. A cooling apparatus for cooling a turbine blade comprising:
- a pressure side plate comprising a plurality of pressure ribs;
- a suction side plate comprising a plurality of suction ribs;
- a plurality of flow redirection areas;
- said pressure side plate disposed over said suction side plate;
- wherein said pressure ribs re disposed at a first angle with respect to a blade span reference line and said suction ribs are disposed at a second angle with respect to said blade span reference line so as to form said flow redirection areas,
- wherein an upper edge of said cooling apparatus is disposed below a blade cover and a lower edge of said cooling apparatus is disposed above a blade root;
- wherein a cooling apparatus trailing edge is disposed to a turbine blade trailing edge;
- wherein a cooling apparatus leading edge is disposed to be spaced apart from a turbine blade leading edge;
- wherein said lower edge of said cooling apparatus is disposed to be in communication to said blade root through at least one lower channel;
- wherein said upper edge of said cooling apparatus is disposed to be in communication to said blade cover through at least one upper channel.

47. A cooling apparatus for cooling a turbine blade comprising:
- a pressure side plate comprising a plurality of pressure ribs;

a suction side plate comprising a plurality of suction ribs;

a plurality of flow redirection areas;

said pressure side plate disposed over said suction side plate;

wherein said pressure ribs re disposed at a first angle with respect to a blade span reference line and said suction ribs are disposed at a second angle with respect to said blade span reference line so as to form said flow redirection areas, wherein an upper edge of said cooling apparatus is disposed below a blade cover and a lower edge of said cooling apparatus is disposed above a blade root;

wherein a cooling apparatus leading edge is disposed to a turbine blade leading edge;

wherein a cooling apparatus trailing edge is disposed to be spaced apart from a turbine blade trailing edge;

wherein said lower edge of said cooling apparatus is disposed to be in communication to said blade root through at least one lower channel;

wherein said upper edge of said cooling apparatus is disposed to be in communication to said blade cover through at least one upper channel.

48. A cooling apparatus for cooling a turbine blade comprising:

a pressure side plate comprising a plurality of pressure ribs;

a suction side plate comprising a plurality of suction ribs;

a plurality of flow redirection areas;

said pressure side plate disposed over said suction side plate;

wherein said pressure ribs are disposed at a first angle with respect to a blade span reference line and said suction ribs are disposed at a second angle with respect to said blade span reference line so as to form said flow redirection areas, wherein an upper edge of said cooling apparatus is disposed below a blade cover and a lower edge of said cooling apparatus is disposed above a blade root;

wherein a cooling apparatus leading edge is disposed to be spaced apart from a turbine blade leading edge;

wherein a cooling apparatus trailing edge is disposed to be spaced apart from a turbine blade trailing edge;

wherein said lower edge of said cooling apparatus is disposed to be in communication to said blade root through at least one lower channel;

wherein said upper edge of said cooling apparatus is disposed to be in communication to said blade cover through at least one upper channel.

49. A cooling apparatus for cooling a turbine blade comprising:

a pressure side plate comprising a plurality of pressure ribs;

a suction side plate comprising a plurality of suction ribs;

a plurality of flow redirection areas;

said pressure side plate disposed over said suction side plate;

wherein said pressure ribs re disposed at a first angle with respect to a blade span reference line and said suction ribs are disposed at a second angle with respect to said blade span reference line so as to form said flow redirection areas, wherein at least one of said pressure ribs that is disposed to contact a coolant has a plurality of concavities thereon.

50. A method of fabricating a cooling apparatus for a turbine blade comprising:

aligning a pressure side plate, said pressure plate comprising a plurality of pressure ribs disposed at a first angle with respect to a blade span reference line, and a suction side plate comprising a plurality of suction ribs disposed at a second angle with respect to said blade span reference line, to form a plurality of flow redirection areas between said pressure side plate and said suction side plate, configuring at least one of said pressure ribs that is disposed to contact a coolant with a plurality of concavities thereon.

51. A method of fabricating a cooling apparatus for a turbine blade comprising:

aligning a pressure side plate, said pressure plate comprising a plurality of pressure ribs disposed at a first angle with respect to a blade span reference line, and a suction side plate comprising a plurality of suction ribs disposed at a second angle with respect to said blade span reference line, to form a plurality of flow redirection areas between said pressure side plate and said suction side plate;

spacing said pressure ribs and said suction ribs in a first rib spacing for said leading edge cooling section; and spacing said pressure ribs and said suction ribs in a second rib spacing for said trailing edge cooling section;

wherein said first rib spacing and said second rib spacings are disposed to control a flow of a coolant in said leading edge cooling section and said trailing edge cooling section, respectively.

52. The method of claim 27, wherein aligning comprises joining said pressure side plate and said suction side plate.

* * * * *